United States Patent [19]

Belew et al.

[11] 3,936,942

[45] Feb. 10, 1976

[54] OPTICAL PANTOGRAPH

[75] Inventors: Robert R. Belew, Huntsville, Ala.; Donald E. Davis, Upton, Mass.

[73] Assignee: National Aeronautics and Space Administration Office of General Counsel-Code GP, Washington, D.C.

[22] Filed: Dec. 11, 1974

[21] Appl. No.: 531,573

[52] U.S. Cl. .................. 33/24 R; 33/25 R; 346/108; 354/4; 350/288
[51] Int. Cl.² .................. B43L 13/10; G02B 5/08
[58] Field of Search ......... 356/2; 250/558; 346/108; 354/4; 248/476; 350/288; 33/23 R, 24, 151, 25

[56] References Cited
UNITED STATES PATENTS

| | | | |
|---|---|---|---|
| 1,662,830 | 3/1928 | Lund | 33/24 C |
| 1,914,258 | 6/1933 | Howey | 33/23 J |
| 2,048,154 | 7/1936 | Abbott et al. | 33/24 C |
| 2,613,127 | 10/1952 | Geiser | 346/29 |
| 3,040,626 | 6/1962 | Griffioen | 350/288 |
| 3,175,295 | 3/1965 | Selley | 33/24 R |
| 3,244,893 | 4/1966 | Miller et al. | 356/2 |
| 3,528,424 | 9/1970 | Ayres | 331/94.5 |
| 3,776,113 | 12/1973 | Parks et al. | 346/29 |

Primary Examiner—Richard E. Aegerter
Assistant Examiner—John W. Shepperd
Attorney, Agent, or Firm—Wayland H. Riggins; L. D. Wofford, Jr.; John R. Manning

[57] ABSTRACT

An optical pantograph for directing light beams and the like from a source to a receiver according to the movement of a pointer. The device can be used for, among other things, directing a laser beam and the like to a target for etching patterns on a target according to the movement of a pointer relative to a pattern trace.

2 Claims, 3 Drawing Figures

OPTICAL PANTOGRAPH

The invention described herein may be manufactured and used by or for the Government for governmental purposes without the payment of any royalties thereon or therefor.

BACKGROUND OF THE INVENTION

The present invention relates to an optical pantograph and more particularly to a device for directing light beams such as laser beams, light waves emitted from the sun, and the like, to a receiver. Heretofore, devices have been developed for directing light beams according to predetermined patterns such as shown in U.S. Pat. No. 3,776,113 and U.S. Pat. No. 2,686,101. While these devices may operate satisfactorily for the purposes intended, it can be seen that such are fairly complicated, particularly the apparatus shown in U.S. Pat. No. 2,686,101 which is utilized for reproducing surface contours. In U.S. Pat. No. 3,776,113, a collimated light source is mechanically deflected in a cartesian reference frame to record graphical data on photosensitive media. Conventional or high speed electromechanical plotting apparatus can be used to implement the deflection. While this device may be satisfactory for plotting, it is not seen how such can be readily used for directing a light beam such as a laser beam to a receiver according to a predetermined pattern.

SUMMARY OF THE INVENTION

The invention includes an optical pantograph for directing light beams and the like from a source to a receiver according to a predetermined pattern or by continuously aligning the pointer optically with either a moving source or a moving receiver. The optical pantograph includes a mirror with a first downwardly extending leg attached thereto and a second downwardly extending leg spaced from said first leg pivotally attached thereto. A third downwardly extending leg is centrally disposed between the first and second leg and has an upper end attached to the mirror. A slidable joint is carried on a lower portion of the third downwardly extending leg. Pivotal braces extend between the first and second legs and the slidable joint for maintaining the distance between the first leg and the third leg equal to the distance between the second leg and the third leg. By maintaining such distances equal, it can be seen that an angle defined by the first leg and the third leg and the corresponding brace is always equal to the angle defined by the second leg and the third leg and the corresponding brace connected therebetween. A pointer is carried on the lower end of the first leg and such can be manipulated so as to trace a pattern. The lower end of the second leg is rotatably secured to any suitable device so as to permit the pointer to be able to follow a desired trace. As the pointer is moved, the slidable joint is raised and lowered on the third leg causing the mirror to deflect the light beam impinging thereon to a different portion of the receiver so that the light beam follows the trace made by the pointer.

Accordingly, it is an important object of the present invention to provide an improved device for deflecting light beams and the like.

Still another important object of the present invention is to provide a device for directing a concentrated or unconcentrated energy source in a collimated beam towards a desired target and to alter the target point according to the manipulation of the mechanism.

Still another important object of the present invention is to provide a simple and accurate device for controlling and manipulating a light beam according to predetermined patterns.

Still another important object of the present invention is to provide a device for directing a concentrated or unconcentrated energy source in a cullimated beam towards a desired target and to alter the sighting direction to the energy source to continuously accommodate a moving energy source, such as the sun.

These and other objects and advantages of the invention will become apparent upon reference to the following specification, attendant claims, and drawing.

DESCRIPTION OF A PREFERRED EMBODIMENT

Figure 1:
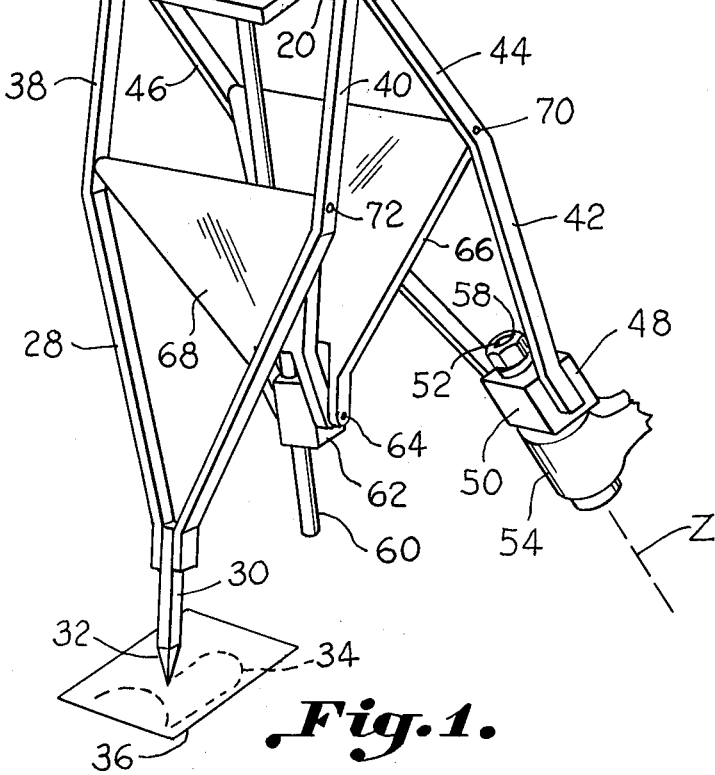
FIG. 1 is a perspective view illustrating an optical pantograph constructed in accordance with the present invention.

Referring in more detail to FIG. 1 of the drawing, there is illustrated a light source generally designated by the reference character 10, which may be any suitable light source such as a laser beam source. It is to be understood that the light source could be the sun, a picture produced by a projector, or any other similar device. The particular source 10 is provided for generating a laser beam 12 which is directed towards a substantially square shaped mirror 14 for being reflected back upwards to a receiver 16 in the form of a rectangular plate. Dotted lines 18, shown on the plate, are provided to assimilate the path that the beam has travelled on the plate. If it is desired to etch a pattern on the receiver 16, such can be used to assimilate the etched pattern.

The mirror surface 14 is supported on a cradle 20 which has a pair of upwardly extending arms 22 and 24 through which a pin 26 passes.

A first downwardly extending leg 28 has its upper ends pivotally connected by pin 26 to the mirror 14. Carried on a lower end of the first downwardly extending leg 28 is a pointer 30 which has a sharpened point 32 on the lower end thereof which is used to follow the trace 34 on a pattern 36. The tip 32 of the pointer as illustrated in FIG. 1 falls on an imaginary spherical surface whose coordinate origin is at the intercept of the Z-axis and the upper surface of the mirror 14. The first downwardly extending leg 28 includes a pair of spaced arms 38 and 40 which are positioned on opposite sides of the mirror 14 and have holes extending through the upper ends for accommodating the pins 26. The lower ends of the downwardly extending arms 38 and 40 converge towards the pointer 30 and are secured to an upper end thereof by any suitable means such as welding.

A second downwardly extending leg 42 is also pivotally attached by its upper end to the mirror 14. The second downwardly extending leg 42 is defined by a pair of spaced arms 44 and 46 which have holes extending through the upper ends thereof for accommodating the pins 26. The lower ends of the second downwardly extending leg 42 converge toward a pivot joint 48 and are secured thereto by any suitable means such as welding. The pivot joint 48 includes a block 50 through which a bolt 52 extends so as to permit the second downwardly extending arm 42 to rotate along an axis Z. The bolt 52 is journaled within a housing 54 which is, in turn, secured to any fixed member such as illustrated by the reference character 56. A nut 58 is carried on the upper end of the bolt 52 for preventing the second leg 42 from slipping off of the bolt.

Disposed intermediate the first and second downwardly extending legs 28 and 42 is a third downwardly extending leg 60 which is in the shape of a rod that has its upper end secured to the member 20 which supports the mirror so that any movement of the rod causes the mirror 14 to move accordingly.

A slidable joint 62 having a longitudinal bore extending therethrough is provided for slipping over the rod 60 so that the rod can move freely up and down therein. The slidable joint 62 is in the form of a block and has pins 64 extending out opposite sides thereof for permitting pivotal braces 66 and 68 to be pivotally attached thereto. The upper ends of braces 66 and 68 are connected between the legs 28 and 42 accordingly. For example, the brace 66 is pivotally connected between the downwardly extending arms 44 and 46 of the second leg 42 by means of pins 70. Similarly, the brace 68 is connected between the downwardly extending arms 38 and 40 of the first leg by means of pins 72. The lower ends of the braces 66 and 68 include a pair of spaced arms through which the pins 64 extend for pivotally attaching such to the slidable block 62. The length of the braces 66 and 68 are identical so as to maintain the first and second downwardly extending legs 28 and 42 an equal distance from the second rod 60.

Figure 2:
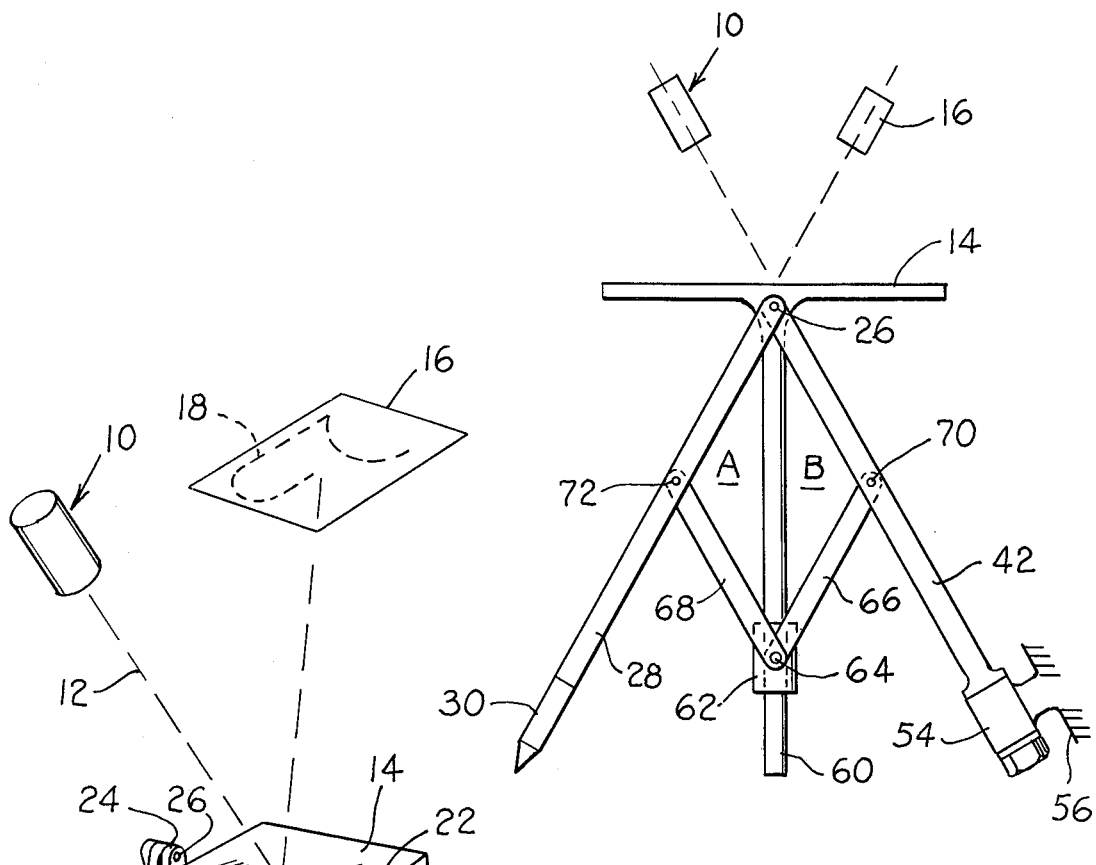
FIG. 2 is a side elevational view of the optical pantograph shown in FIG. 1.

As can be seen in FIG. 2, the triangle A defined by the brace 68, the upper portion of leg 28 and the portion of the rod 60 extending between pin 26 coupled to the mirror 14 and the pin 64 coupled to the sliding joint 62 is equal to the triangle B provided by the brace 66, the upper portion of the second leg 42 between the pin 70 and the pin 26, and the portion of the slidable rod between the pin 26 and the pin 64. These triangles A and B are always maintained equal as the pointer 30 is moved along a trace on the pattern 36. As the pointer moves outwardly, the slidable joint 62 slides upwardly on the rod 60.

In operation, as the pointer is moved about the trace 34 carried on the pattern 36, the rod 60 will rotate so as to always bisect the angle between the legs 28 and 42. The slidable joint 62 slides up and down on the rod 60 as it rotates. Since the rod 60 is connected to the mirror 14, the mirror will tilt as the rod rotates changing the location of the reflected beam on the receiver. Thus, if it is desired to use a laser beam from the source 10 to etch a pattern on a receiver 16, it is only necessary to put a corresponding pattern on a pattern trace 36 and trace out the pattern by moving the pointer 30 therealong. The beam 12 will follow the pattern traced and, in turn, be reflected on to the receiver to etch a corresponding pattern on the receiver.

In one particular embodiment, instead of the rotatable joint 54 only being allowed to rotate about the Z axis, such can be changed so as to allow the second arm 42 to slide up and down within the joint 54 so as to permit the pointer to be moved off a given horizontal plane in order to trace contoured surfaces. Such would require the mounting of the block 48 on a rod so that it would operate similar to the slidable joint 62.

Figure 3:
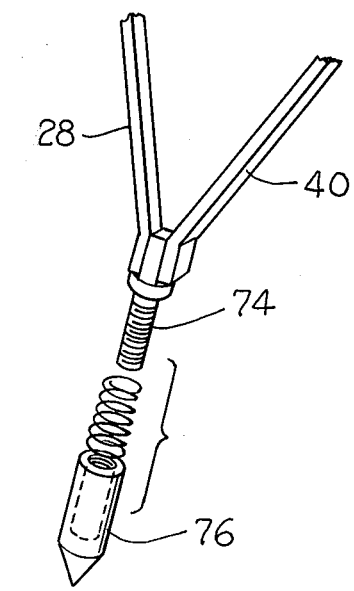
FIG. 3 is a fragmentary view showing a pointer modified to provide for a sliding action along the line-of-sight direction of the movable leg which allows the pointer to adjust to surface irregularity in the trace pattern.

The pointer 30 may be modified as shown in FIG. 3 to slide longitudinally to accommodate irregular or imperfect trace patterns. Such a pointer would include a shank portion 74 carried on a lower end of legs 28 and 40. A tubular pointer 76 is carried on the shank portion 74 with a spring 78 provided on the shank portion 74 for forcing the pointer away from the collar 80.

Therefore, the pointer 76 is permitted to slide up and down on the shank portion 74 as it is moved over irregular surfaces.

The optical pantograph is not necessarily limited in size to a small device. Large reflectors several feet in diameter could conceivably be incorporated in a scaled-up version to reflect solar rays on a target. A multiplicity of these reflectors geometrically arrayed with respect to a common collector would form the basis for a solar heater for power conversion to steam and then ultimately to electricity. For each such reflector assembly, the leg 42 would be aligned with the receiver while leg 28 would be maintained in alignment with the sun during sunlight hours.

While a preferred embodiment of the invention has been described using specific terms, such description is for illustrative purposes only, and it is to be understood that changes and variations may be made without departing from the spirit or scope of the following claims.

What is claimed is:

1. An optical pantograph for directing light beams and the like from a source to a receiver according to a predetermined pattern, said pantograph comprising:
    a first downwardly extending leg;
    a mirror;
    means for pivotally attaching an upper end of said first downwardly extending leg to said mirror with said first leg extending downwardly along a first longitudinal axis;
    a pointer carried on the lower end of said first leg;
    a second downwardly extending leg;
    means for pivotally attaching an upper end of said second downwardly extending leg to said mirror with said second leg extending downwardly along a second longitudinal axis at an angle to said first axis;
    means for focusing collimated light beams along one of said axes to said mirror for reflection from said mirror;
    means for receiving said light beams reflected from said mirror, said receiving means being located on the other of said axes;
    a third downwardly extending leg centrally disposed between said first and second legs and having an upper end attached to said mirror;
    a slidable joint;
    a lower portion of said third leg extending through said slidable joint;
    a pivotal brace means carried between said first and second legs and said slidable joint for maintaining the distance between said first leg and said third leg equal to the distance between said second leg and said third leg;
    means for rotatably securing said second leg on a horizontal plane for rotation only about said second axis so that said first leg moves relative to said second leg as said pointer is moved about said pattern;

whereby a light beam reflected from said mirror to said receiver is angularly reflected according to the angular movement of said first leg relative to said second leg.

2. The invention as defined in claim 1, including means for mounting said pointer in a yieldably retractable attachment whereby said pointer may automatically adjust its longitudinal position as it is moved over irregular surfaces.

* * * * *